INVENTOR.
GEORGE K. FARNEY
BY Harry E. Aine
ATTORNEY

FIG. 7
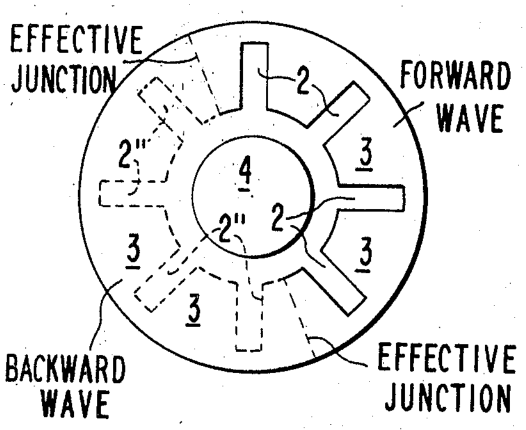
FIG. 8
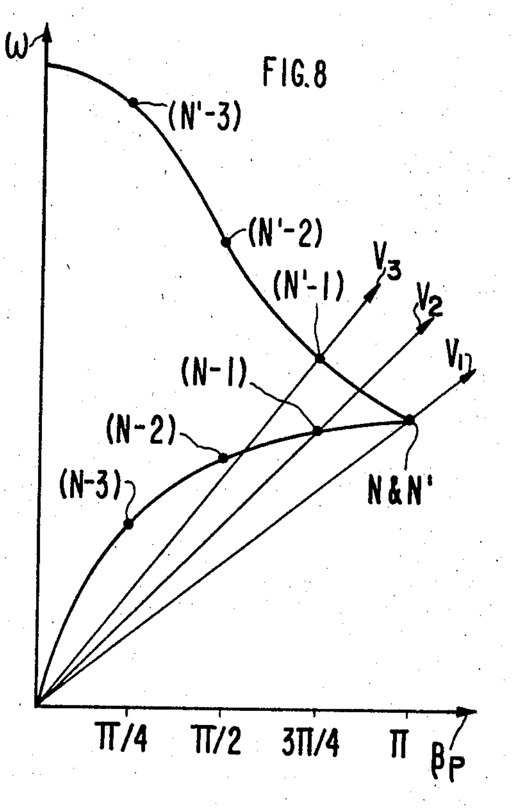
FIG. 9
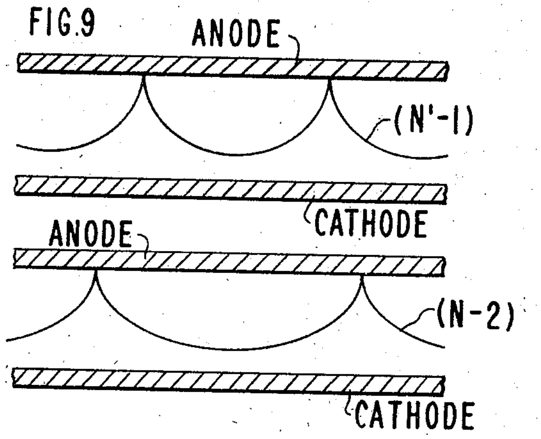
FIG. 10(A)
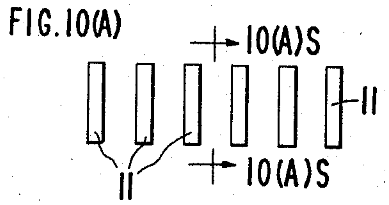
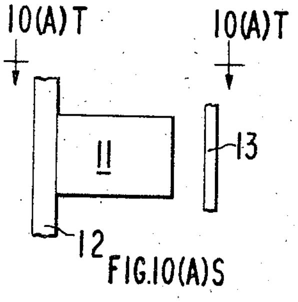
FIG. 10(A)S
FIG. 10(A)T
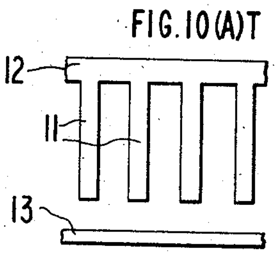
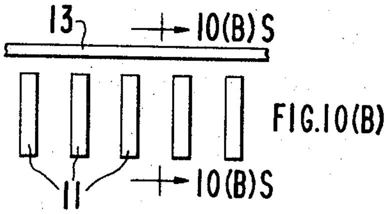
FIG. 10(B)
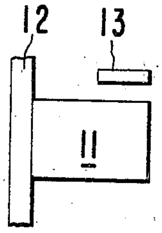
FIG. 10(B)S
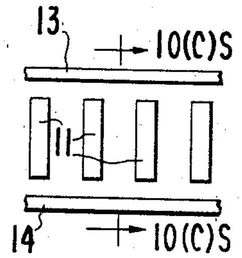
FIG. 10(C)
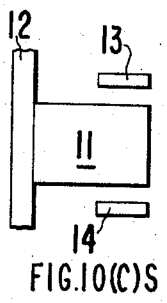
FIG. 10(C)S
INVENTOR.
GEORGE K. FARNEY
BY Harry S. Aine
ATTORNEY

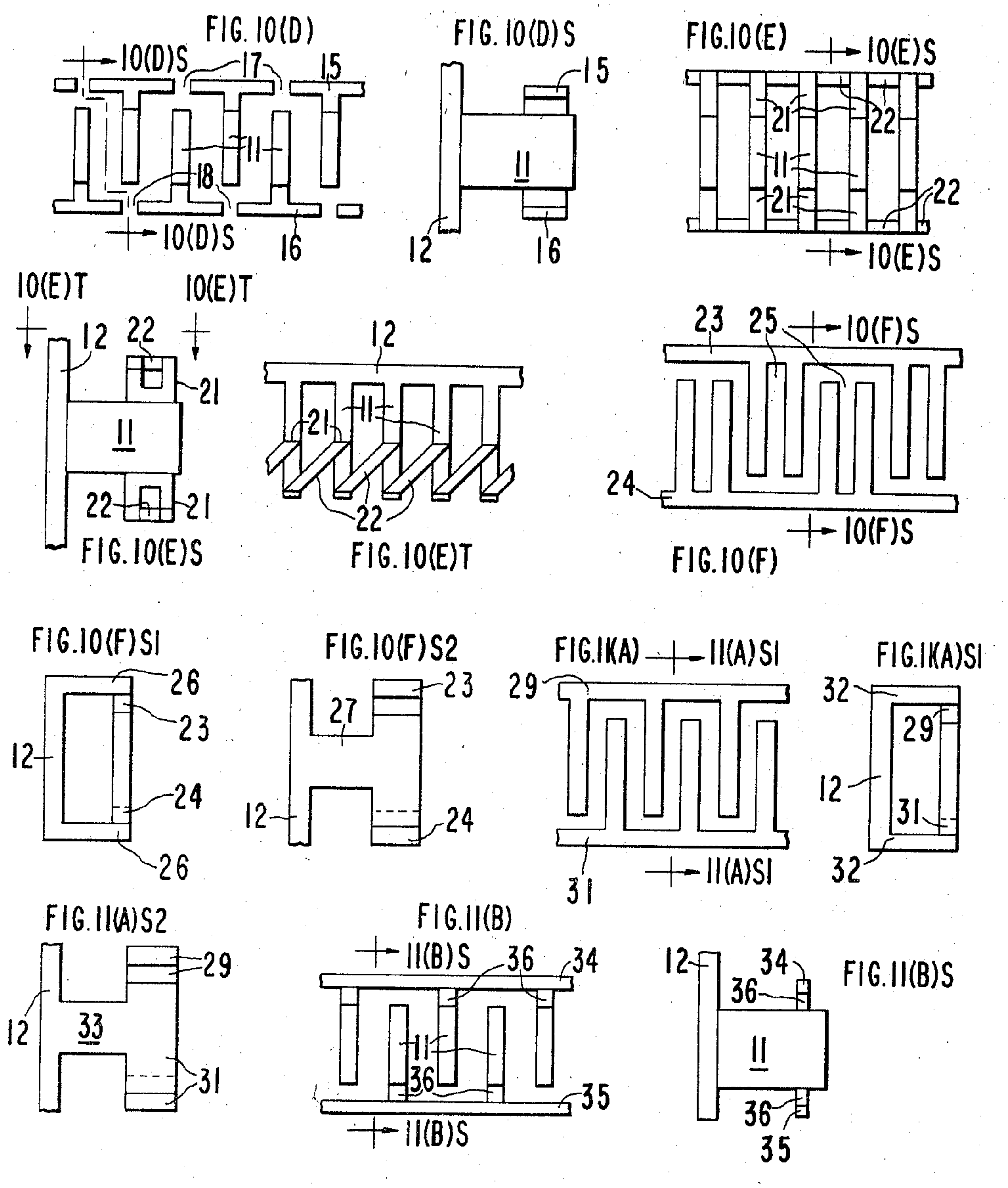
FIG. 10(D), FIG. 10(D)S, FIG. 10(E), FIG. 10(E)S, FIG. 10(E)T, FIG. 10(F), FIG. 10(F)S1, FIG. 10(F)S2, FIG. 11(A), FIG. 11(A)S1, FIG. 11(A)S2, FIG. 11(B), FIG. 11(B)S
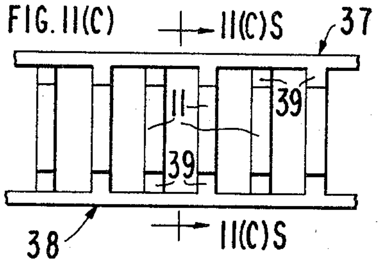
FIG. 11(C)
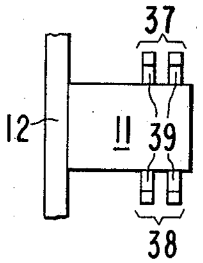
FIG. 11(C)S
INVENTOR.
GEORGE K. FARNEY
BY Harry E. Aine
ATTORNEY

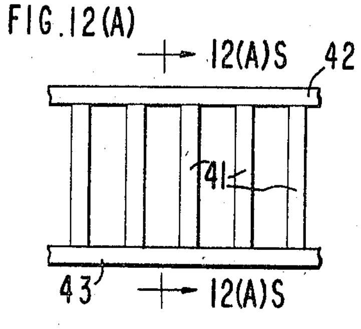
FIG. 12(A)
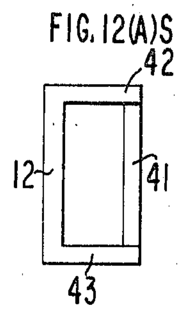
FIG. 12(A)S
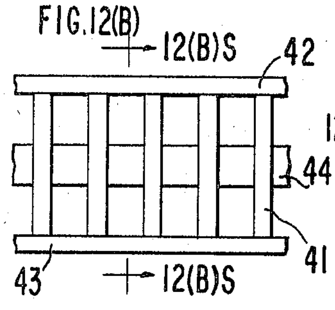
FIG. 12(B)
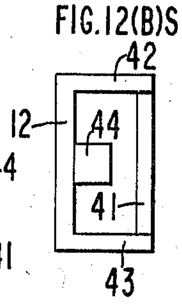
FIG. 12(B)S
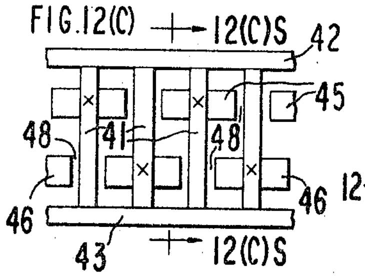
FIG. 12(C)
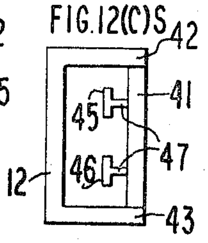
FIG. 12(C)S
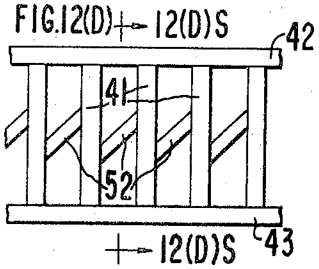
FIG. 12(D)
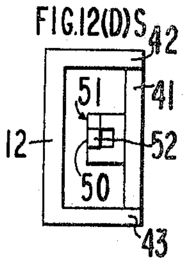
FIG. 12(D)S
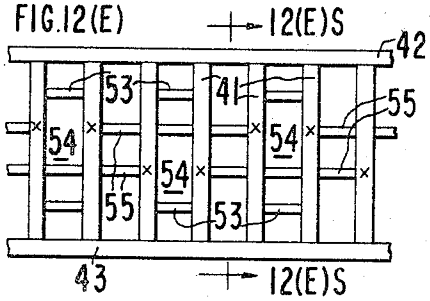
FIG. 12(E)
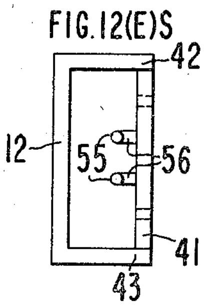
FIG. 12(E)S
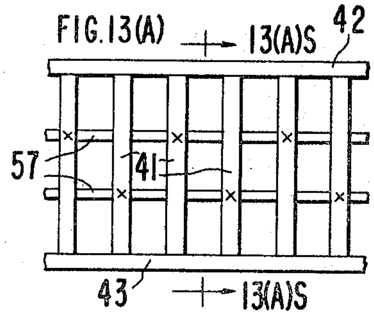
FIG. 13(A)
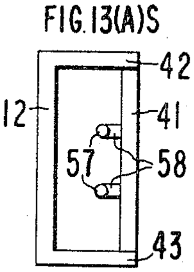
FIG. 13(A)S
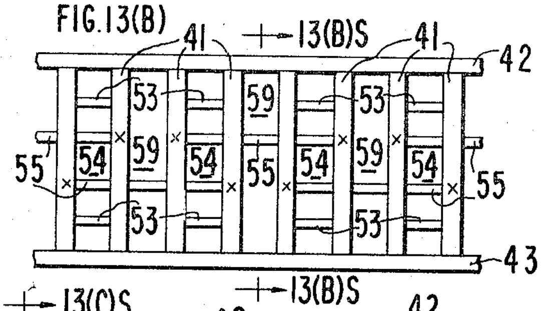
FIG. 13(B)
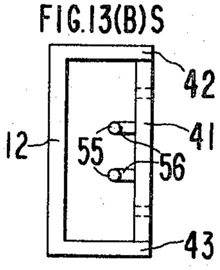
FIG. 13(B)S
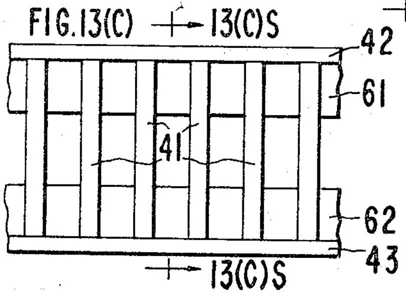
FIG. 13(C)
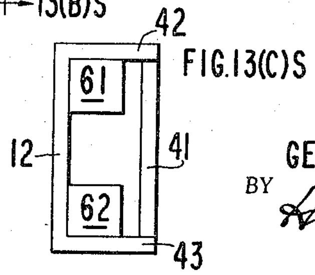
FIG. 13(C)S
INVENTOR.
GEORGE K. FARNEY
BY Harry E. Aine
ATTORNEY

INVENTOR.
GEORGE K. FARNEY
BY
ATTORNEY

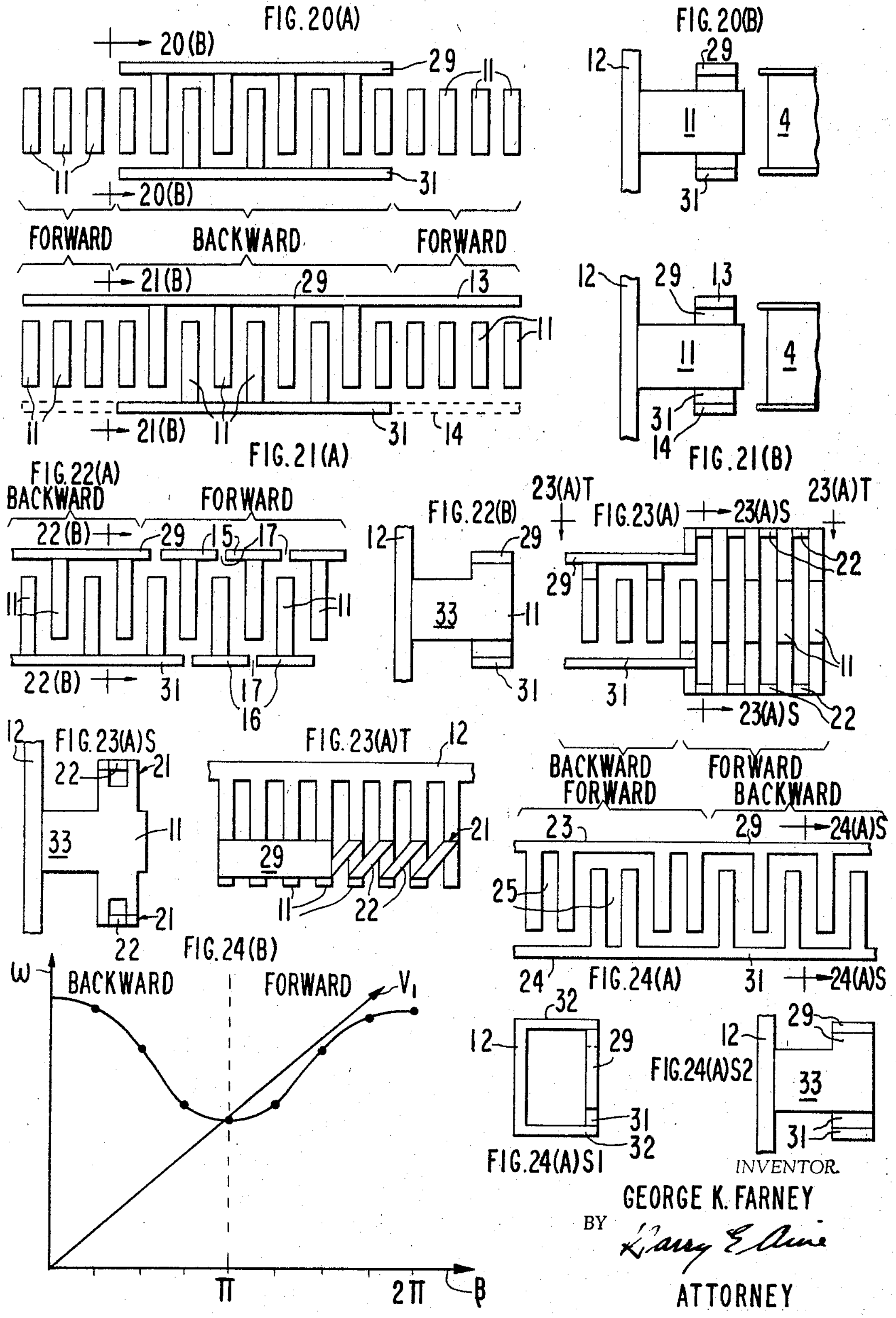
FIG. 20(A), FIG. 20(B), FIG. 21(A), FIG. 21(B), FIG. 22(A), FIG. 22(B), FIG. 23(A), FIG. 23(A)S, FIG. 23(A)T, FIG. 24(A), FIG. 24(B), FIG. 24(A)S1, FIG. 24(A)S2
INVENTOR.
GEORGE K. FARNEY
BY Harry E. Aine
ATTORNEY INVENTOR.
GEORGE K. FARNEY
BY Harry E. Aine
ATTORNEY United States Patent Office 3,437,875
Patented Apr. 8, 1969

3,437,875

MIXED LINE COMPOSITE MAGNETRON INTERACTION CIRCUITS OF FORWARD WAVE AND BACKWARD WAVE TYPES

George K. Farney, New Providence, N.J., assignor to S-F-D Laboratories, Inc., Union, N.J., a corporation of New Jersey Filed Dec. 27, 1965, Ser. No. 516,271
Int. Cl. H01j 25/34, 25/58
U.S. Cl. 315—39.3 14 Claims

ABSTRACT OF THE DISCLOSURE

Improved mixed-line magnetron interaction circuits and microwave tubes using same are disclosed. Each of the mixed-line interaction circuits is formed of at least a first and second circuit section having different dispersion characteristics but the composite circuit characterized in having one predominant common mode of electronic operation such common operating point typically occurring at the $\pi$ mode. The mixed-line interaction circuits have a common basic circuit type for the plural circuit sections, i.e., either a bar or vane circuit forms the basic circuit element used in the plural circuit sections of the composite circuit. Several composite circuit geometries are disclosed which have the advantage of being relatively easily constructed and are characterized by having improved power handling capability. Included in the circuits disclosed are circuits having a forward wave circuit portion selected from the class consisting of helix coupled bar, ladder line, capacitively loaded ladder line, alternating series and shunt element bar, unstrapped vanes, helix coupled vanes, and reactively loaded interdigital line. The other circuit section is a backward wave section selected from the class consisting of strapped bar, inductively loaded bar, alternating series and shunt element interaction bar, and interdigital line.

Heretofore it has been proposed to build mixed line interaction circuits such that the different sections have different dispersion characteristics with a common intersecting or operating point at the $\pi$ mode of operation. Such a mixed interaction circuit permits a substantial increase in interfering mode frequency separation for a periodic interaction circuit with a given number of periodic elements; i.e., vanes, bars, slots and the like. Prior mixed line composite interaction circuits have generally taken the form of rather complex strapping arrangements, complex vane resonators, or combinations of both. For example, M. R. Boyd, U.S. 3,121,822 issued Feb. 18, 1964, shows two sets of four concentric straps on both top and bottom of a vane array. D. A. Wilbur in U.S. 3,121,820 shows an array of widely differing shaped hole and slot resonators. Se Puan Yu 3,121,821 shows a combination of irregular vane resonator shapes and irregular strap geometry; while D. A. Wilbur in U.S. 3,176,188 shows another complicated arrangement of straps on a vane array. These prior composite anode circuits are difficult to build holding the required tolerances and moreover are lacking in power handling capability and design flexibility achievable by other types of circuits such as bar circuits, helix coupled bar circuits, interdigital line circuits and the like.

In the present invention there are provided a number of composite mixed line circuits having one or more improved properties of ease of fabrication, power handling capability, design flexibility and efficiency. Moreover, certain of the improved composite circuits of the present invention lend themselves readily to use as high power amplifier circuits or as tunable oscillator circuits.

The principal object of the present invention is the provision of improved mixed line magnetron interaction circuits for use in microwave tubes which are easier to build and which exhibit improved output performance.

One feature of the present invention is the provision of novel mixed line magnetron interaction bar circuits of composite forward and backward wave type wherein the circuit is formed by sections of differently strapped, coupled or loaded arrays of bars whereby power handling capability of the circuit is enhanced.

Another feature of the present invention is the provision of a novel mixed line magnetron interaction circuit wherein at least one of the sections of the composite circuit is formed by a type of interdigital line.

Another feature of the present invention is the same as the preceding feature wherein another section of the composite circuit is selected from the class consisting of an unstrapped vane array, helix coupled vane array, or reactively loaded interdigital line.

Another feature of the present invention is the same as any one or more of the preceding features wherein there are a different number of periodic elements in adjacent circuit sections of the composite line circuit to inhibit undesired mode interference.

Other features and advantages of the present invention will become apparent upon a perusal of the following specification taken in connection with the accompanying drawings wherein:

FIG. 1($a$) is a schematic linearized diagram for the vane circuit of FIG. 1,

Figures 5, 6:
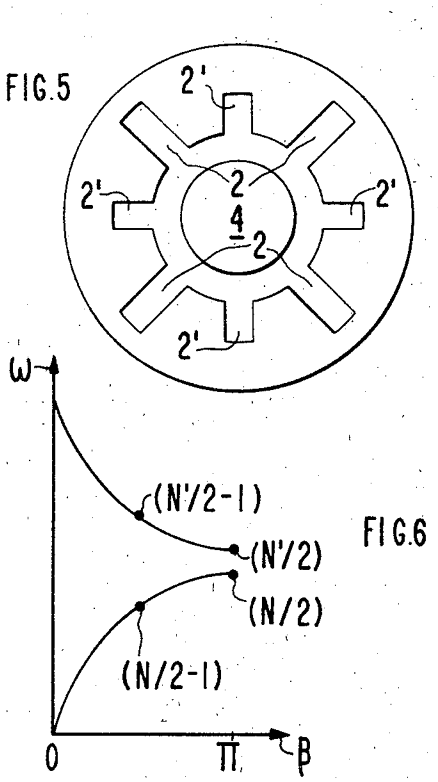
FIG. 5 is a schematic diagram for a prior art rising sun magnetron.
Figure 25A:
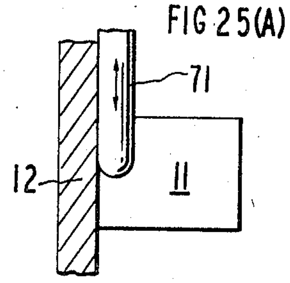
Figure 25B:
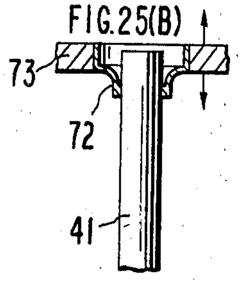
Figure 25C:
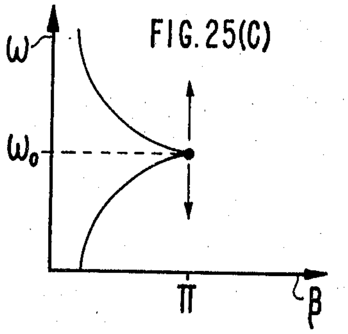
Figures 26, 26A, 27:
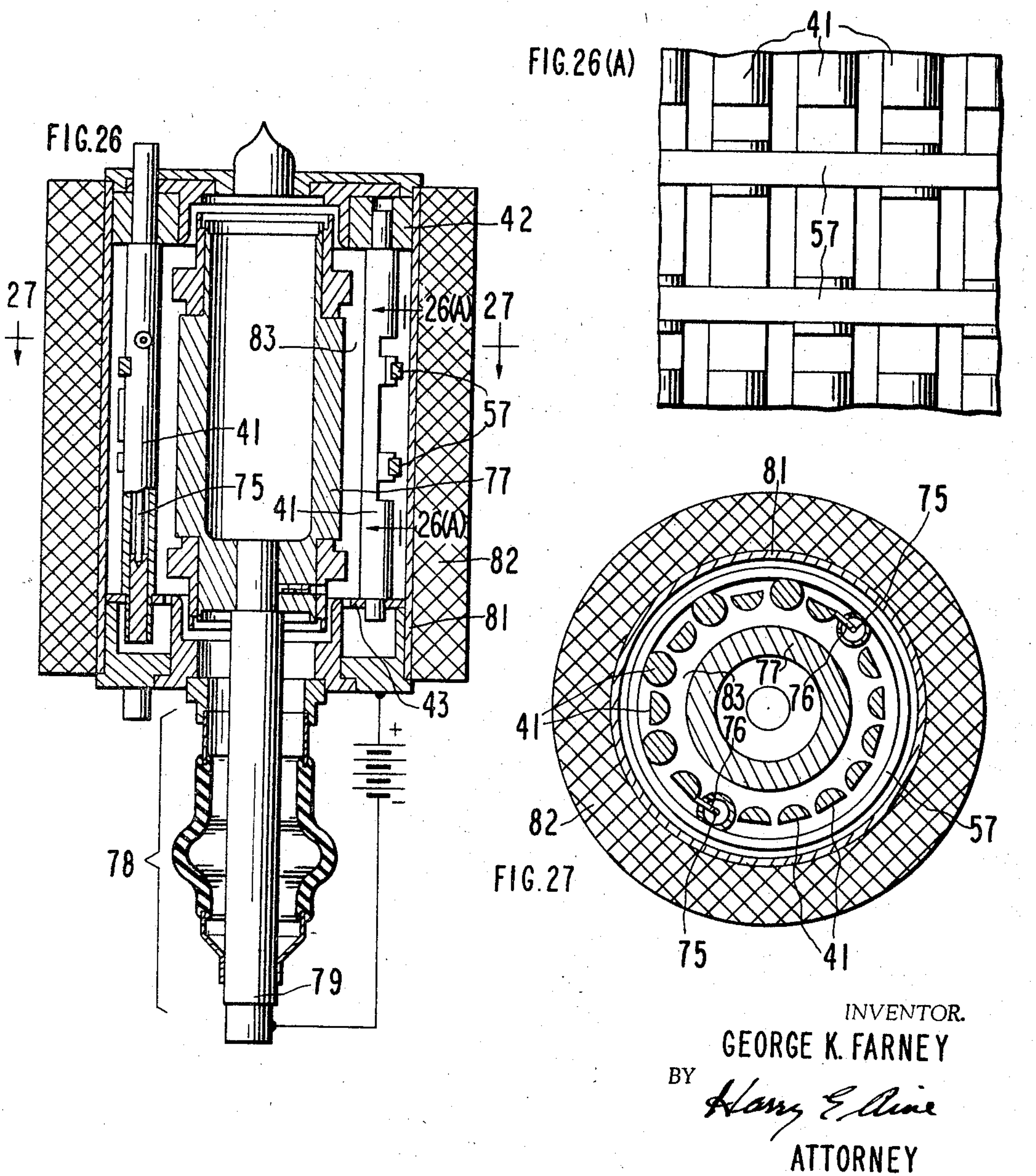

FIG. 6 is an $\omega$ versue $\beta$ diagram for the rising sun magnetron of FIG. 5, FIG. 7 is a schematic diagram of a prior art mixed line magnetron, FIG. 8 is an $\omega$ versus $\beta$ diagram for the magnetron of FIG. 7, FIG. 9 is a schematic line diagram of a linearized electron spoke pattern for two different synchronous $\beta$'s, FIGS. 10($a$)–($f$) are schematic line diagrams of various forward wave vane circuits, FIGS. 11($a$)–($c$) are schematic line diagrams of various backward wave vane circuits, FIGS. 12($a$)–($e$) are schematic line diagrams of various forward wave bar circuits, FIGS. 13($a$)–($c$) are schematic line diagrams of various backward wave bar circuits, FIGS. 14–19 are schematic line diagrams of composite bar circuits of the present invention, FIGS. 20–24 are schematic line diagrams of composite vane circuits of the present invention, FIGS. 25(A) and (B) are detail sectional views of alternative tuning elements and FIG. 25(C) is an $\omega$-$\beta$ diagram depicting the tuning effect of the tuners of FIGS. 25(A) and (B), FIG. 26 is a longitudinal sectional view of a magnetron employing an improved magnetron interaction circuit of the present invention, and FIG. 27 is a transverse sectional view of the structure of FIG. 26 taken along line 27—27 in the direction of the arrow.

In order to explain the operation and advantages of the composite mixed line type of interaction circuit it will be worthwhile to give some background information concerning the mode of operation and mode interference problems of prior conventional magnetron circuits. This background information will be related to FIGS. 1–6.

Figure 1:
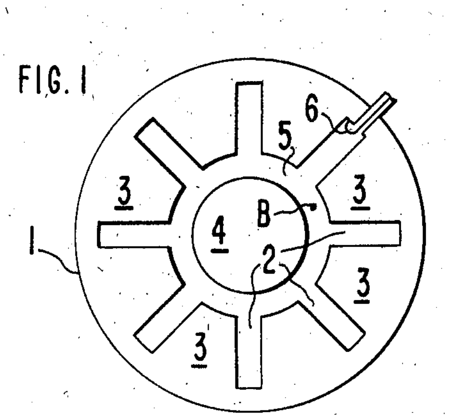
FIG. 1 is a schematic diagram of a prior art vane magnetron.
Figures 1A, 2:
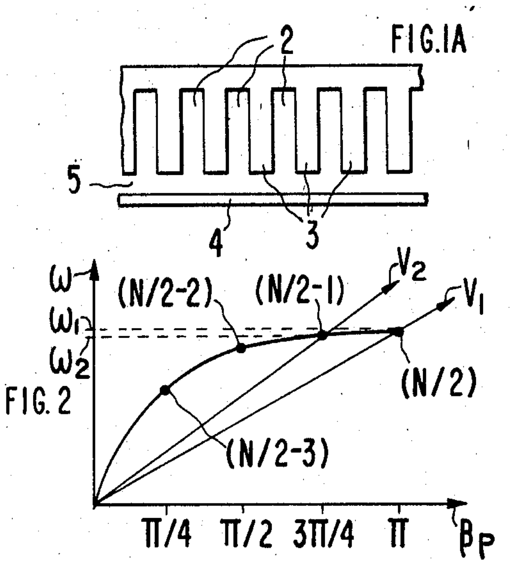
FIG. 2 is an $\omega$ versus $\beta$ diagram for the magnetron of FIG. 1.

Referring now to FIG. 1, there is shown a conventional vane or slot magnetron oscillator circuit comprised of a copper anode 1 provided with a radially directed array of slots 2 approximately one-quarter wavelength long in the radial direction at the frequency of the oscillator. The slots 2 define an array of radial quarter wavelength vanes 3 therebetween. A cathode emitter 4 is axially positioned and a positive potential is applied to the anode relative to the cathode 4. An axially directed magnetic field B is provided in the annulus, forming the magnetron interaction region 5, between anode and cathode. A coupling loop 6 extracts power to a load, not shown.

The vane array anode circuit of the magnetron of FIG. 1 is merely an array of vanes over a ground plane (see FIG. 1(*a*)) where the cathode 4 is the ground plane. A vane array over a ground plane has a fundamental forward wave dispersion characteristic as shown by the continuous dotted line in FIG. 2. However, when the anode circuit is closed back on itself forming an R.F. re-entrant circuit, as in the magnetron of FIG. 1, the dispersion characteristic becomes discontinuous with interaction being obtained only at discrete frequencies or modes as indicated by the solid heavy dots on the curve of FIG. 2. The reason for this discontinuous mode of operation is that since the slow wave circuit is re-entrant it is necessary that the slow wave pattern, as measured along the circumference of the anode, exist with only integral numbers of whole-wavelengths. Thus, an anode containing an even number of N resonators 2 has only $N/2$ possible resonant modes exclusive of the zero mode which is of no significance.

Therefore, the magnetron of FIG. 1, having 8 slot resonators, will have $N/2$ or 4 resonant modes of operation with equally spaced phase shift $\beta$ per section as shown. From the dispersion curve of FIG. 2, it is seen that the $$\left(\frac{N}{2}-1\right)$$

and the $N/2$ or $\pi$ modes are very close together in frequency. This fact gives rise to magnetron moding between the $\pi$ mode and the $$\left(\frac{N}{2}-1\right)$$

mode when the number of resonators 2 is increased in order to obtain high power operation, i.e., more anode for dissipation of the energy of the electron stream. For example, it is seen for the dispersion diagram of FIG. 2 corresponding to 8 resonators that the $$\left(\frac{N}{2}-1\right)$$

and the $\pi$ mode are close together in frequency, but as the number of cavity resonators is increased in order to accommodate a larger cathode and a larger anode for more power, N becomes much larger and the $$\left(\frac{N}{2}-1\right)$$

mode moves much closer in phase to the $\pi$ mode and therefore severe moding problems are encountered. Thus, high power unstrapped magnetrons are characterized by a relatively few number of resonators to prevent moding and thus may achieve only moderate power levels.

Figure 3:
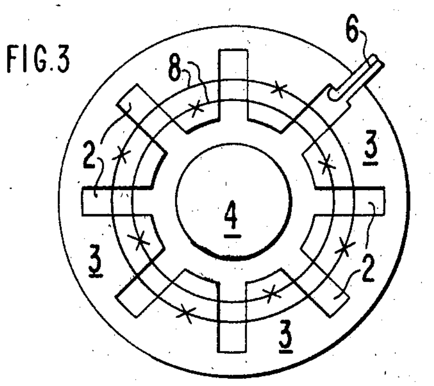
FIG. 3 is a schematic diagram of a prior art strapped magnetron.
Figure 4:
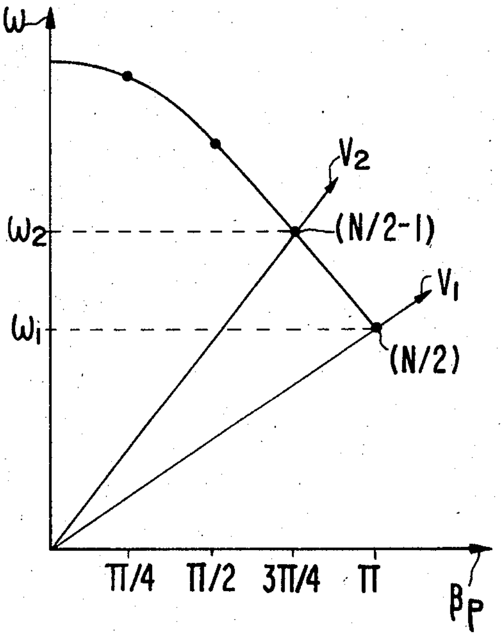
FIG. 4 is an $\omega$ versus $\beta$ diagram for the magnetron of FIG. 3.

Referring now to FIG. 3, there is shown a conventional strapped magnetron which represents an attempt to obtain greater frequency separation between the $$\left(\frac{N}{2}-1\right)$$

and the $\pi$ mode. More specifically, a pair of conductive straps 8 are provided. Each strap is connected to alternate vanes as indicated by the (X) marks with adjacent resonator vanes being connected to alternate straps of the pair. The strapping as shown in FIG. 3 changes the dispersion characteristic of the magnetron to a backward wave fundamental mode as shown in FIG. 4. As seen in FIG. 4, the backward wave characteristic obtains greater frequency separation between the $\pi$ and $$\left(\frac{N}{2}-1\right)$$

modes. For a magnetron utilizing only 8 vane resonators, this separation is appreciable. However, as can be readily appreciated as the number of resonators is increased to obtain higher power operation of the tube, the $$\left(\frac{N}{2}-1\right)$$

mode moves much closer in frequency to the $\pi$ mode with the result that the practical limit for high power operation of a strapped magnetron corresponds to a magnetron having approximately 30 vane resonators. While 30 vane resonators permit magnetrons to have appreciable power level, it is desired to have still higher power levels.

Another technique for obtaining mode separation has been the provision of the rising sun type magnetron anode. In this type of anode, as shown in FIG. 5, alternate resonators 2' are made substantially shorter in radial length. This results in splitting the dispersion characteristic for the composite circuit into two branches for the fundamental mode as shown in FIG. 6. The upper branch of the dispersion curve is associated predominantly with the shorter resonators 2' whereas the lower branch of the dispersion curve is associated predominantly with the larger resonators 2. When the circuit is made reentrant, there are, as obtained previously in the magnetron circuits of FIGS. 1 and 3, $N/2$ resonant modes of operation. However, in this case, N is the number of similar resonators, i.e., short or long. Since the resonator system has been broken into two different resonator types having N and N' resonator each, a magnetron anode circuit having 8 resonators would have 4 resonators of the N type and 4 resonators of the N' type. Thus, each branch would have only two possible resonant modes corresponding to $N/2$ and $$\frac{N}{2}-1$$

Thus, the rising sun type anode circuit obtains substantial mode separation permitting a greater number of anode resonators to be employed without encountering moding. However, in the rising sun type magnetron, the desirable $\pi$ mode is of a slightly different frequency for the short and long resonators 2' and 2 such that mode impurity can be obtained when operating on the desired $\pi$ mode. This mode impurity results in reduced operating efficiency as compared to a circuit operating without mode impurity on the $\pi$ mode. In practice, it has been found that the rising sun type structure permits proper operation in circuits with slightly more resonators than 30.

This now leads us to the composite mixed line type of magnetron circuit wherein the circuit is characterized as having two different sections, i.e., one section having a forward wave dispersion characteristic and the other section having a backward wave characteristic. Such a circuit is shown in FIG. 7 and has a dispersion characteristic as shown in FIG. 8. As found with the rising sun type of circuit, the fundamental mode of operation has two dispersion branches one corresponding to the forward wave circuit section and the other corresponding to the backward wave circuit section.

On the other hand, contrary to that found in the rising sun magnetron, there will be N rather than $N/2$ resonant modes in each branch of the dispersion curve. This comes about because of the wave reflections at the junctions between the adjoining backward and forward wave sections.

These junctions cannot be matched because of the divergent nature of dispersion curves of the adjoining sections. There are twice as many modes for the same reasons that a resonator cavity can be dimensioned an integral number of full or half wavelengths between reflective ends.

Thus, in the dispersion curve of FIG. 8 for the circuit of FIG. 7 which has 4 forward wave periodic elements N and 4 backward wave periodic elements N′, there are 4 resonant modes at equal $\beta$ separation in each branch of the composite dispersion curve. Although in FIG. 8 there appears to be substantial mode separation, it appears that the $(N-2)$ mode and the $(N'-1)$ mode have a common synchronous voltage $V_3$.

This raises the question whether these two modes will oscillate or mode at the common voltage $V_3$. The answer is that they will not, provided that there are not too many resonators 2 or 2″ in each section. This can be seen by the spoke current diagram of FIG. 9 which shows the spoke current space separation around the interaction gap for the two previously proposed interfering modes of operation, namely the $(N-2)$ and the $(N'-1)$ modes. From the diagram of FIG. 9 it is seen that the spoke patterns are considerably different and, therefore, the spoke pattern for the $(N-2)$ mode would not carry over into the $(N-1)$ mode to produce cumulative interaction and sustained oscillation on these two possible modes.

It is preferred that the number of cells, elements, or resonators in each circuit section be small so that a single section of the mixed line cannot oscillate independently because it would have insufficient gain. This would be true even though the applied voltage was proper for synchronous interaction with one of the modes. Possible interference for a single synchronous voltage could still be further inhibited by varying the number of cells, elements or resonators in each forward wave and backward wave section so that the frequency and voltage of the $(N-1)$ mode differs on a section to section basis even for those circuit sections having a common pass band. A suitable sequence of number of forward wave periodic elements N and backward wave periodic elements N′ for a high power large anode mixed line circuit would be as follows:

$$/N/N'/(N+2\ /(N'+4)/(N-2)/N'/(N+6)/(N'-2)/$$

Although each mixed line circuit section has twice as many modes as the non-mixed line circuits, having an equal number of elements, a very great enhancement in separation for the total anode circuit is obtained for the mixed line because the number of elements in each section may be substantially less than the total number of elements in the anode circuit. That is, the anode circuit may be composed of several forward and several backward wave circuit sections, each of relatively few elements, and the mode separation for the composite circuit will be characteristic of the mode separation within each section which, of course, is much greater than if the entire anode circuit were completely composed of all identical elements.

Thus, for the composite mixed line circuit having alternate sections of forward and backward wave dispersion characteristics with relatively few elements per section, the only mode which can satisfy all boundary conditions leading to cumulative interaction will be the common $\pi$ mode of the system. This means that this composite mix line circuit arrangement leads to a powerful method for inhibiting all other types of mode interference. As above stated, this inhibiting feature can be further enhanced by deliberately having the number of cells be different in each circuit section to enhance this effect.

There are at least two basic types of circuits which may be used to advantage in magnetron tubes. One of these two types of circuits is what may be generally called a vane type of circuit which defines an array of quarter wave slot resonators and the other type of circuit is the bar circuit. The bar circuit may also be considered as an array of half wavelength slots in a plate, the metal which is left between the slots forming the bars of the bar circuit. Given these two basic types of circuits, the vane circuit and the bar circuit, and recognizing that certain ones of the vane circuits will have forward wave characteristics and certain ones will have backward wave characteristics and likewise for the bar circuits, it can be seen that a large number of mixed line circuit combinations are possible which will yield the desired composite circuit having both forward and backward wave sections.

To more fully appreciate all of the possible combinations of both vane and bar circuits, FIGS. 10(*a*) through (*f*) are provided to show the forward wave vane circuits, FIGS. 11(*a*)–(*c*) are provided showing the various backward wave vane circuits, whereas FIGS. 12 and 13 show the forward and backward wave bar circuits, respectively. The various vane circuits of both forward and backward wave type are listed in Table I and may be briefly described as follows:

TABLE I.—VANE CIRCUITS, FIGS. 10 AND 11

*A. Forward Wave, FIG. 10*

(1) Willman Circuit, FIG. 10(*a*)
(a) Simple quarter wave slot (unstrapped magnetron), FIG. 10(*a*)
(b) Hole and slot
(These can be used with the cathode for a ground plane or with one or two auxiliary ground planes, FIGS. 10(*b*) and 10(*c*)
(2) Vane Type $C_{1-3}$, FIG. 10(*d*)
(3) Helix Coupled Vane Circuit, FIG. 10(*e*)
(a) Single helix
(b) Double helix, FIG. 10(*e*)
(4) Reactivity Loaded Interdigital Line, FIG. 10(*f*)
(a) Crown supported, FIG. 10(*f*)*s*1
(b) Choke supported, FIG. 10(*f*)*s*2

*B. Backward Wave, FIG. 11*

(1) Interdigital line, FIG. 11(*a*)
(a) Crown supported, FIG. 11(*a*)*s*1
(b) Choke supported, FIG. 11(*a*)*s*2
(2) Strapped Circuit, FIG. 11(*b*) and 11(*c*)
(a) Single strap, FIG. 11(*b*)
(b) Double strap, FIG. 11(*c*)

FIG. 10(*a*) shows the front view of a vane circuit of the type shown in the magnetron of FIG. 1 and can be briefly described as an array of vanes 11 projecting from a wall 12 as shown in the side view 10(*a*)*s* and the top view 10(*a*)*t*. The circuit is utilized with a ground plane member 13 which may be the cathode typically placed adjacent the ends of the vanes 11; alternatively, the ground plane may take the form of one or two straps 13 and 14, respectively, as of copper which may overlie the ends of the vanes 11 as shown in FIGS. 10(*b*)*s* and 10(*c*)*s*, respectively. FIGS. 10(*d*) and 10(*d*)*s* show a vane circuit with $C_{1-3}$ coupling. The $C_{1-3}$ coupling refers to the fact that the vanes 11 are strapped by a pair of straps 15 and 16 as of copper which overlie the top and bottom, respectively, of the vanes. These straps on each side of the vanes are connected to every other one of the vanes 11, i.e., they are connected to the first and third vanes in a repetitive manner. In addition, the straps are slotted at 17 and 18 such that each of the straps 15 and 16 is not conductively connected but rather capacitively series coupled together, thus giving rise to the $C_{1-3}$ designation. FIG. 10(*e*) shows a double helix coupled vane circuit. The helix 21 as of copper may be conveniently formed by a hollow rectangular tube brazed to the top of the vanes and including an array of slots cutting through all sides of the rectangular tube with the exception of the top wall. The top wall is then slotted with an array of diagonal slots to leave diagonal members 22 interconnecting adjacent vanes 11. FIG. 10(*f*) shows a reactively loaded interdigital line which may be either crown supported as shown in FIG. 10(*f*)*s*1 or stub-supported as shown in FIG. 10(*f*)*s*2. Briefly, the reactively loaded interdigital line comprises a pair of interdigitated comb-like conductors 23 and 24, respectively, as of copper. The interdigitated finger portions of the combs are bifurcated at 25 to improve the forward wave interaction. In the crown supported version, shown in FIG. 10(*f*)*s*1, a pair of plates 26 as of copper extend out from the conductive back wall 12 and interconnect to the conductors 23, 24, respectively. In the case of the choke support version shown in FIG. 10(*f*)*s*2, high impedance stub members 27 as of copper extend out from the back wall 12 to contact each one of the finger portions.

The backward wave vane circuits are shown in FIGS. 11(*a*)–(*c*). FIG. 11(*a*) shows the conventional interdigital line formed of a pair of interdigitated comb-like conductors 29 and 31 as of copper, the teeth of the comb-like structures preferably being vanes and being interdigitated. As before, with the interdigital line circuit of FIG. 10(*f*), the interdigital line conductors may be either crown or stub-supported as shown in FIGS. 11(*a*)*s*1 and 11(*a*)*s*2, respectively. In the crown supported version the comb conductors 29 and 31 are fixedly mounted to the back wall 12 via the conductive plate members 32 as of copper. In the stub or choke supported version of FIG. 10(*a*)*s*2 the interdigitated fingers are supported from the back wall 12 via the intermediary of high impedance choke conductive members 33 as of copper connected to each finger intermediate its length. FIGS. 11(*b*) and 11(*c*), respectively, show the conventional single and double strapped vane circuits. More specifically, in FIG. 11(*b*) a pair of straps, overlying top and bottom side edges of the vane array, are connected to alternate vanes 11 by means of conductive tabs 36 as of copper. In the double strapped version of FIG. 11(*c*) one pair of straps 37 is provided overlying the tops of the vanes and another pair of straps 38 is provided overlying the bottom of the vanes. Each strap in each pair of straps is connected to alternate, i.e., every other, vanes 11 by means of conductive tabs 39 as of copper.

Table II describes the various possible forward and backward wave bar circuits which are shown in FIGS. 12 and 13.

TABLE II.—BAR CIRCUITS, FIGS. 12 AND 13

*A. Forward Wave, FIG. 12*

(1) Simple ladder line (Easitron), FIG. 12(*a*)
(2) Ridge loaded ladder line (Karp circuit), FIG. 12(*b*)
(3) $C_{1-3}$, FIG. 12(*c*)
(4) Helix coupled ladder line, FIG. 12(*d*)
(5) Alternating series and shunt bar circuit strapped for forward wave interaction, FIG. 12(*e*)

*B. Backward Wave, FIG. 13*

(1) Double strapped bar, FIG. 13(*a*)
(2) Inductively loaded bar circuit (Anti-Karp circuit), FIG. 13(*c*)
(3) Alternating series and shunt bar circuit strapped for backward-wave interaction, FIG. 13(*b*)

Referring now to FIGS. 12(*a*)–(*e*), there are shown various forward wave bar circuits. FIG. 12(*a*) shows the conventional ladder line circuit comprised of an array of half-wavelength bars 41, as of copper, the half-wavelength resonant frequency of the bars forming the upper cutoff frequency of the circuit. The bars 41 are connected at their ends to a pair of conductors 42 and 43 as of copper, respectively, which may be supported from the back wall 12 of the circuit. FIG. 12(*b*) shows a ridge loaded ladder line. The ridge loaded ladder line includes a conductive loading ridge member 44 as of copper projecting outwardly from the back wall 12 in close proximity to the central region of the array of bars 41 for increasing the electronic impedance of the circuit. FIG. 12(*c*) shows a $C_{1-3}$ strapped bar circuit wherein a pair of parallel straps

45 and 46 as of copper are interconnected to the bars intermediate their lengths via conductive tab members 47 as of copper. Each strap of the pair of straps is connected via tab 47 to alternate ones of the bars 41. The X's denote points where the straps are connected to the bars. Each of the straps has been segmented by slots 48 such that each composite strap is series capacitively coupled together. FIG. 12(*d*) shows a helix coupled ladder line wherein a helix 51 as of copper is joined along one side to the central portions of the bars 41 of the bar array. As beforementioned in the helix coupled vane circuit, the helix 51 is conveniently made from a hollow rectangular tube which is slotted with an array of transverse slots through all but one wall 50, the remaining wall being slotted with an array of diagonal slots to leave a plurality of diagonal conductive members 52 interconnecting adjacent turns of the helix 51. FIG. 12(*e*) shows an alternating series and shunt bar circuit with the series loading elements being resonated above the frequency of the shunt elements. More specifically, the bar array defines a series of slot resonators between adjacent bars. Alternate slots are provided with shorting elements 53 as of copper interconnecting adjacent bars and serving to shorten the length of the slot containing the shorting elements. This raises the resonant frequency of this slot. In this manner, alternate slots along the bar array are resonated at a higher frequency than the remaining slots. A pair of rod-like strapping conductors 55 as of copper are centrally disposed of the bars 41 and extend longitudinally of the array of bars. Each strapping conductor 55 of the pair of conductors, is connected via tabs 56 as of copper to the bars at the points as indicated by the X marks. In this manner the short slots 54 are connected in series with the strapping conductors 55 with successive short slots being connected in series with alternate ones of the pair of straps 55.

FIG. 13 shows the various backward wave bar circuits. FIG. 13(*a*) shows a double strapped ladder line wherein a pair of straps 57 as of copper are connected as indicated by the X's with each strap connected to alternate ones of the bars 41 via tabs 58 as of copper. FIG. 13(*b*) shows an alternating series and shunt element bar circuit with the series element resonant below the shunt element. More specifically, the circuit is substantially the same as that of FIG. 12(*e*) with the exception that the long slots 59 are connected in series with the pair of straps 55 instead of the short slots 54. Referring now to FIG. 13(*c*), there is shown the conventional ladder line circuit except that it is provided with two inductive loading ridges 61 and 62, respectively, for inductively loading the ladder line.

Thus, it has been shown in FIGS. 10–13 and pointed out in Tables I and II the various vane and bar type circuits, both of the forward and backward wave fundamental type, that may be used to advantage in magnetrons operating at relatively high power levels.

TABLE III.—VANE TYPE COMPOSITE BACKWARD AND FORWARD WAVE CIRCUITS (1) Quarter wave slot circuit, with interdigital line, with single strapped circuit, with double strapped circuit.

The quarter wave slot circuit is a general description and refers to simple quarter wave slots, hole and slot construction, pie shaped slots, any of these circuits with a single ground plane or with double ground plane.

The interdigital line may be crown or choke supported.

The double strapped circuits may have straps on only one or on both sides of the vane circuit.

(2) Vane type $C_{1-3}$ circuits, with interdigital line, with single strapped circuit, with double strapped circuit.

(3) Helix coupled vane circuit, with interdigital line, with single strapped circuit, with double strapped circuit.

The helix coupled vane circuit may utilize one or two helices.

(4) Reactively loaded interdigital line, with interdigital line, with single strapped circuit, with double strapped circuit.

The reactively loaded interdigital line may be crown or choke supported.

TABLE IV.—BAR TYPE COMPOSITE BACKWARD AND FORWARD WAVE CIRCUITS (1) Simple ladder line, with double strapped bar circuit, with inductively loaded bar circuit, with alternating series and shunt bar circuit strapped for backward wave interaction.

(2) Ridge loaded ladder line, with double strapped bar circuit, with inductively loaded bar circuit, with alternating series and shunt bar circuit strapped for backward wave interaction.

(3) Bar type $C_{1-3}$ circuit, with double strapped bar circuit, with inductively loaded bar circuit, with alternating series and shunt bar circuit strapped for backward wave interaction.

(4) Helix coupled ladder line, with double strapped bar circuit, with inductively loaded bar circuit, with alternating series and shunt bar circuit strapped for backward wave interaction.

(5) Alternating series and shunt bar circuit strapped for forward wave interaction, with double strapped bar circuit, with inductively loaded bar circut, with alternating series and shunt bar circuit strapped for backward wave interaction.

Referring now to Table III and to Table IV, the various composite backward and forward wave circuits, both of the vane and bar type, are described which may be utilized to advantage in high power magnetrons for obtaining enhanced mode control. From Tables III and IV it can be seen that there are quite a number of different combinations of both vane and bar circuits suitable for use in magnetrons. However, not all of these circuits are of equal merit, there being certain ones of the circuits which have definitely preferred characteristics. Accordingly, there will now be described in FIGS. 14–19 certain preferred embodiments of the composite backward and forward wave circuits of the bar and vane type.

FIG. 14 shows a preferred embodiment of the present invention comprising a composite slow wave circuit made up of a strapped bar circuit as previously described with regard to FIG. 13(*a*) having a backward wave mode of operation coupled to a forward wave section of the composite line formed by a helix coupled bar circuit as previously described in FIG. 12(*b*). This composite circuit of FIG. 14 provides a circuit which is relatively easy to build and which has high thermal capacity and also has the mode control advantages of the mixed line composite backward and forward wave circuit.

Figures 14A, 14B, 15, 16A, 16B, 17A, 17B, 18A, 18B, 18C:
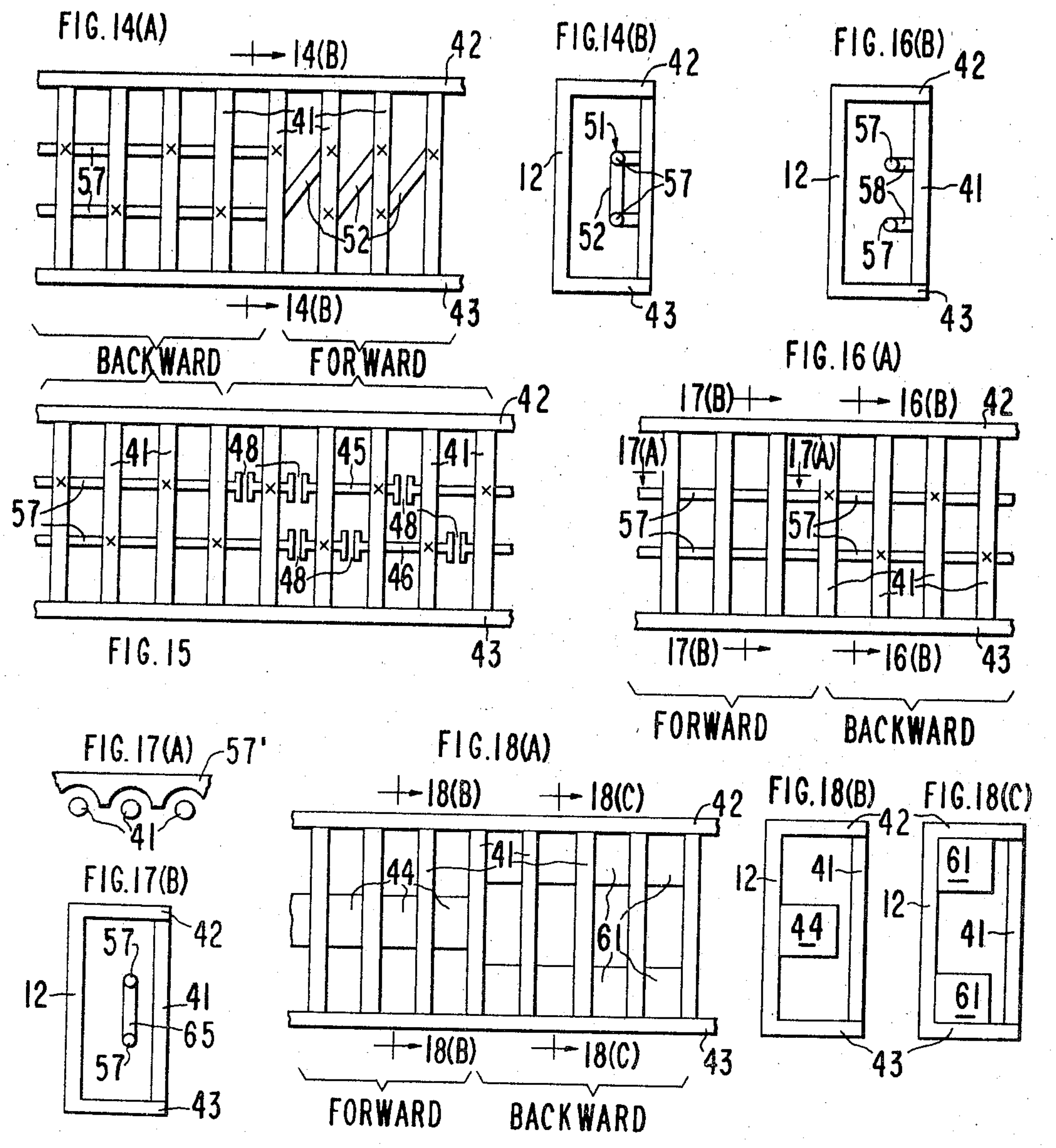

Referring now to FIG. 15, there is shown another preferred bar type composite backward and forward wave magnetron interaction circuit. In this embodiment the backward wave section is the same as that previously described in FIG. 13(*a*) and comprises merely a double strapped bar circuit. The forward wave section which is joined to the backward wave section comprises the $C_{1-3}$ strapped bar circuit previously described in FIG. 12(*c*). In FIG. 15, the capacitive coupling slots 48 in the straps 45 and 46 have been displaced from behind the bars for clarity. This circuit is especially easy to fabricate since the straps 57, 45, and 46, may be formed by a single pair of straps suitably connected to the bars as by brazing with the straps merely being cut to form slots 48 over the forward wave section to provide the $C_{1-3}$ coupling. The composite mixed line circuit of FIG. 15 forms the subject matter of and is claimed in copending U.S. application 516,272, filed Dec. 27, 1965 and assigned to the same assignee as the present invention.

Referring now to FIG. 16, there is shown another preferred bar circuit embodiment of the composite mixed line magnetron circuit. In this circuit the composite circuit is formed by a forward wave section comprising an unstrapped bar circuit or ladder line of the type previously described in FIG. 12(*a*). The backward wave section is formed by a double strapped ladder line or bar circuit type previously described in FIG. 13(*a*). The two straps 57 of the backward wave circuit may be allowed to extend behind the unstrapped forward wave circuit portion to provide additional capacitive loading to the ladder line thereby increasing its operating bandwidth to improve mode separation. This latter capacitive loading of the forward wave ladder line can be enhanced by allowing the non-contacting straps 57 to closely surround and extend partially into the spaces between adjacent bars 41 of the circuit as shown at 57' in FIG. 17(*a*) which is a view of the circuit portion of FIG. 16(*a*) taken along line 17(*a*)—17(*a*) in the direction of the arrows. The capacitive loading of the unstrapped ladder line section may be still further enhanced by providing a shorting plane 65 between the two strap segments 57 in the manner as shown in FIG. 17(*b*). The composite circuit embodiments of FIGS. 16 and 17 have the advantage of being relatively easy to build while providing high thermal capacity, characteristic of the bar type circuits.

FIG. 18 shows another composite mixed line circuit forming a preferred embodiment of the present invention. In this circuit, a forward wave section is formed by the capacitively loaded ladder line circuit previously described in FIG. 12(*b*). This circuit is joined to an inductively loaded ladder line circuit previously described in FIG. 13(*c*) forming the backward wave section.

Figure 19:
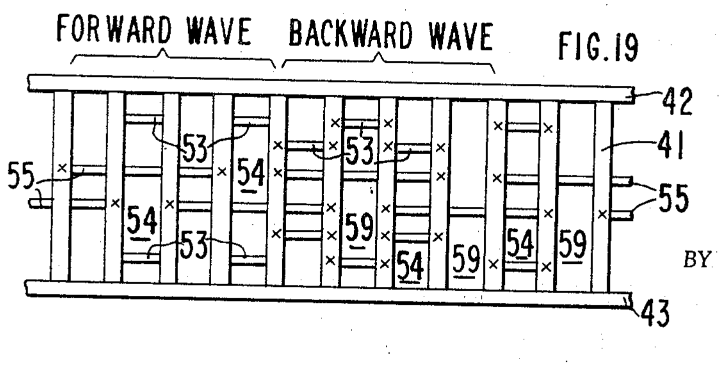

Referring now to FIG. 19, there is shown another bar circuit preferred embodiment of the mixed line composite magnetron circuit of the present invention. In this embodiment, a forward wave circuit section is formed by an alternating series and shunt element bar circuit with the series elements 54 resonant above the shunt element, i.e., long slots. This type of circuit has previously been described with regard to FIG. 12(*e*). The backward wave section of the composite circuit is formed by an alternating series and shunt element interaction circuit of the type previously described with regard to FIG. 13(*b*) wherein the series elements are resonant below the shunt element frequency. A common $\pi$ mode occurs at the high frequency end of the forward wave portion and the low frequency end of the backward wave portion. This leads to a resonant frequency for the series elements which are nearly the same for both sections of the composite circuit. The shunt element, i.e., long slots, of the forward wave portion has a resonant frequency below that of the series element 54 and the resonant frequency of the series element 59 of the backward wave portion is resonant at a lower frequency than that of the shunt element of that portion of the circuit. While it may appear that it would be difficult to build the circuit of FIG. 19, it should be remembered that this bar circuit is easily formed by punching out a plate or by using a slot saw for slotting a plate with long and short slots to form the array of connected bars.

In FIGS. 20–24 the various preferred embodiments of vane type composite mixed line circuits will be described. In FIG. 20 there is shown a composite mixed line magnetron interaction circuit wherein the backward wave section is formed by a choke supported interdigital line of the type previously described with regard to FIG. 11(*a*) and 11(*a*)*s*2. However, in this instance the choke support element 33 is formed merely by a continuation of the vane 11 over to the back wall 12. The forward wave section is formed by the unstrapped Millman circuit composed of an array of vane resonators adjacent a ground plane as previously described with regard to FIG. 10(*a*). In this embodiment as in practically all of the vane resonator embodiments, the individual vane resonators may be formed by hole-and-slot, or pie-shaped slot construction as well as by simple slots as shown. The embodiment of FIG. 20 is especially easy to construct since an array of vane resonators may be constructed in the conventional manner. The tops and the bottom edges of the vanes may be removed over the forward wave section and alternate vane edges removed in the backward wave section and straps laid over the taller vanes in the backward wave section.

Referring now to FIG. 21, there is shown a slightly different embodiment of the circuit of FIG. 20 wherein the straps of the backward wave interdigital line section have been extended over, in non-contacting relation, both sides of the vanes of the forward wave section, in the manner as previously described with regard to FIG. 10(*c*). In this embodiment the overlying straps which overlie the forward wave sections may be either of the double or single strap type. The single strap type being previously described with regard to FIG. 10(*b*). The circuit of FIG. 21, having the straps on both sides of the forward wave sections, forms a circuit geometry with enhanced mechanical simplicity and strength and is especially desirable for tunable versions of the magnetron oscillator or amplifier wherein the circuit of FIG. 21 is coupled to a coaxial resonator operable in the circular electric mode via the intermediary of a plurality of slots cut through the common wall therebetween, the slots intersecting with alternate vane resonators of the composite circuit. This latter improved embodiment including the provision of the coaxial resonator coupled to the circuit of 20 or 21 forms the subject matter of a copending application U.S. Ser. No. 516,631, filed Dec. 27, 1965 and assigned to the same assignee as the present invention.

Referring now to FIG. 22, there is shown a composite vane circuit wherein the backward wave section is formed by a choke supported interdigital line of the type previously described in FIGS. 11(*a*) and 11(*a*)*s*2. The backward wave section is joined to a forward wave section of the $C_{1-3}$ vane type previously described with regard to FIG. 10(*d*) with the exception that the forward wave vanes 11 are formed of a T shape. This circuit is especially easy to construct as both the circuit sections may be made substantially of uniform geometry according to the choke supported interdigital line geometry and then transverse slots may be made in the upper and lower straps 15 and 16, respectively, over the forward wave sections to form the $C_{1-3}$ circuit. This circuit forms the subject matter of and is claimed in the aforecited copending U.S. application 516,272, filed Dec. 27, 1965 and assigned to the same assignee as the present invention.

Referring now to FIG. 23, there is shown another preferred embodiment of the composite mixed line circuit of the present invention. In this embodiment, the backward wave circuit section is formed by the choke supported interdigital line previously described with regard to FIGS. 11(*a*) and 11(*a*)*s*2. The forward wave circuit section, which is joined to the backward wave section, is formed by a double helix coupled vane circuit of the type previously described with regard to FIG. 10(*e*). This circuit has special utility because all vanes are mechanically strapped together.

Referring now to FIG. 24, there is shown another preferred embodiment of the present invention. In this circuit the forward wave section of the mixed line composite circuit is formed by the reactively loaded interdigital line previously described with regard to FIG. 10(*f*) which may be either crown supported or choke supported as shown in FIGS. 10(*f*)*s*1 and 10(*f*)*s*2, respectively. The backward wave section of the composite line is formed by an interdigital line of the type previously described with regard to FIG. 11(*a*) and which may be either crown or choke supported as previously described in FIGS. 11(*a*)*s*1 and 11(*a*)*s*2, respectively. In this embodiment, the distance from the back wall 12 to the interdigitated conductor portions for the case of the crown support, or the length of the choke element 33, for the choke supported case, would be adjusted in each of the two circuit sections to cause a common $\pi$ mode for the composite circuit. This arrangement of FIG. 24 is different from the other previously described arrangements in that the pass band of the forward and backward wave sections has a large portion in common but only the $\pi$ mode of each section has the same synchonous voltage $V_1$, see FIG. 24(*b*), which gives the dispersion characteristics for the composite circuit.

All the above-described composite slow wave circuits which have been shown for magnetron operation have been intended primarily for fixed frequency tubes such as would be used on single frequency applications including microwave radar and industrial heating. However, it should be understood that the circuits may be tuned if desired over a relatively small frequency range by, for example, providing sliding contacts that would engage the frequency determining elements of the composite circuit. More specifically, the vane circuits may be tuned in the manner as indicated in FIG. 25(*a*) wherein a conductive tuning rod 71 is axially slidable in engaging contact with the back wall 12 of the vane resonator array 11 to displace the magnetic fields thus changing their resonant frequency. Likewise, the bar circuits may be tuned by means of sliding conductive contacts 72 which contacts engage the ends of the bars 41 for changing their electrical length. The contacts may be carried from an axially movable ring 73 as of copper. Changing the electrical length of the bars 41 changes their resonant frequencies. The electrical effect of changing the length of the bar or the resonant frequencies of the vanes may be seen with regard to the dispersion characteristic of FIG. 25(*c*) where it is shown that the $\pi$ mode corresponding to the resonant frequency of $\omega_0$ is moved up or down in frequency.

The advantages in using the new composite mixed line magnetron interaction circuit geometry is the ability to use a large number of sections for generating power. This will lead to higher peak and average power and, therefore, new arrangements for coupling may be required. Multiple coupling means are very likely desirable such that the high power output may be evenly distributed over the multiple coupling elements. The preferred place for coupling power output from the composite mixed line structures of the present invention is at the junctions of the forward and backward wave circuit sections. Otherwise, additional discontinuities may be introduced into the slow wave structure which could complicate the moding problem.

Referring now to FIGS. 26 and 27, there is shown a magnetron tube apparatus employing the preferred bar composite circuit of FIG. 16 wherein a conventional ladder line is used as the forward wave section and the coupled bar circuit is utilized as the backward wave section. The tube comprises a circular array of the bars 41 which are approximately a half-wavelength long at the $\pi$ mode. The bars are shorted at their ends by means of annular conductive ring members 42 and 43, respectively. A pair of conductive straps 57 coaxially surround the bar array and are connected to every other bar 41 in the backward wave section as by brazing thereto. A convenient way of connecting the straps 57 to alternate bars is to recess alternate bars by cutting off a portion of the outer surface thereof as indicated in FIG. 27. In this manner, these straps 57 pass over these bars without making electrical contact therewith. Over the forward wave portion of the circuit the straps 57 pass over all bars which are recessed. In this manner the straps 57 over the forward wave circuit portion provide capacitive loading to the bars 41 to provide an improved forward wave characteristic. At the junctions of the forward and backward wave sections as indicated in FIG. 27 the bars 41 may be made of tubular form to contain a center conductor 75, thereby forming a coaxial line. The center conductor 75 extends the full length of the bar and is shorted at the end approximately one-quarter wavelength away from a transverse pin 76 which interconnects the center conductor of the coaxial line with the adjacent bar of the other sections of the composite circuit. The connecting end passes out through a hole in the hollow conductor and forms a portion of an inductive coupling loop formed by the end portion of the slot interconnecting adjacent bars. These hollow conductive bars containing the center conductor 75 may be positioned at the junctions between each forward and backward wave section to attain the aforementioned multiple output coupling. The center conductors 75 may then extend axially to a common antenna element for radiation into a suitable waveguide or other output coupling device, not shown.

The bar array forms the composite anode of the circuit and coaxially surrounds a cylindrical cathode emitter 77 which is supported coaxially of the bar array by means of a suitable insulator 78 and conductive cathode stem 79. The bar array is enclosed within a suitable cylindrical vacuum envelope 81 as of copper. A solenoid 82 surrounds the envelope 81 to provide the axial magnetic field in the annular interaction region 83 between the cathode emitter 77 and the bar array.

In operation, a high positive potential is applied to the anode bar array 41 relative to the cathode emitter 77. The cathode emitter 77 may be of the thermionic type to initiate emission to start oscillation of the tube. After oscillation has begun, the thermionic heater may be disengaged as the back bombardment of the cathode emitter supplies sufficient energy to the emitter 77 to sustain operation of the tube, in the conventional manner. Output energy at the resonant frequency of the $\pi$ mode is extracted via the center conductors 75 and fed to the load in the manner as above described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave tube apparatus comprising, means forming a composite mixed-line periodic interaction circuit, means for producing a stream of electrons adjacent said interaction circuit for cumulative electronic interaction therewith to produce an output microwave signal, means for extracting an output signal for propagation to a suitable load, said interaction circuit being formed of plural circuit sections of differing dispersion characteristics with one predominant substantially common mode of electronic operation with said electron stream, said composite circuit having a common basic circuit type throughout comprising a bar type circuit, one of said circuit sections selected from the class of forward wave circuits consisting of, helix coupled bar, ladder line, capacitively loaded ladder, alternating series and shunt element bar, and reactively loaded interdigital line, and the other of said circuit sections being backward wave and selected from the class consisting of, strapped bar, inductively loaded bar, alternating series and shunt element interaction bar, whereby said composite circuit geometries are more easily constructed and have improved power handling capability.

2. The apparatus according to claim 1 wherein said forward wave circuit section is a helix coupled bar type, and said backward wave circuit section is of the strapped bar circuit type having a pair of straps with each strap interconnecting alternate bars of the bar circuit intermediate the length of said bars.

3. The apparatus according to claim 1 wherein said backward wave circuit section is a strapped bar circuit type having a pair of straps with each strap interconnecting alternate bars of the bar circuit intermediate the length of said bars, and wherein said forward wave circuit section is of the unstrapped ladder line type.

4. The apparatus according to claim 1 wherein said backward wave circuit section is of the strapped bar circuit type having a pair of straps with each strap interconnecting alternate bars of the bar circuit intermediate the length of said bars, and wherein said forward wave circuit section is of the unstrapped ladder line type having an array of half-wavelength bars interconnected at their ends by a pair of conductive member portions, the resonant frequency of the bars corresponding to a half-wavelength thereof and defining the upper cutoff frequency of the forward wave section.

5. The apparatus according to claim 4, wherein said straps of said backward wave circuit section overlie in non-contacting relation the bars of said forward wave section to provide additional capacitive coupling to said ladder line forward wave section.

6. The apparatus according to claim 1, wherein said backward wave circuit section is an inductively loaded bar circuit having a pair of conductive members overlying the end portions of said bar array, and wherein said forward-wave section comprises a capacitively loaded ladder line with a conductive member overlying the central region of said array of bars.

7. The apparatus according to claim 1, wherein said backward wave circuit section is an alternating series and shunt element interaction circuit formed by a bar array with the slots between bars alternating in length with the long slots being connected in series with a pair of conductive straps extending around the array of bars, and wherein said forward wave section comprises an array of bars with the adjacent slots defined between adjacent bars alternating in length to define an array of long and short slots, said short slots being connected in series with a pair of straps extending along the length of the array.

8. A microwave tube apparatus comprising, means forming a composite mixed-line periodic interaction circuit, means for producing a stream of electrons adjacent said interaction circuit means for cumulative electronic interaction therewith to produce an output microwave signal, means for extracting an output signal for propagation to a suitable load, said interaction circuit being formed of plural circuit sections of differing dispersion characteristics with but one predominant substantially common mode of electronic operation with said electron stream, said composite line having a common basic circuit type throughout comprising a vane type circuit including interdigital line circuits of the crown and choke supported types, one of said circuit sections selected from the class of forward wave circuits consisting of unstrapped vanes, helix coupled vanes, and reactively loaded interdigital line, and the other of said circuit sections being backward wave and comprising an interdigital line, whereby said composite circuit geometry is more easily constructed and has improved power handling capability.

9. The apparatus according to claim 8, wherein said backward wave circuit section is a strapped vane array with a pair of straps overlying the top and bottom edges of the vanes and each strap being connected to alternate ones of said vanes of said vane array, and wherein said forward wave circuit section is an unstrapped vane array.

10. The apparatus according to claim 9 wherein at least one of the straps of said strapped vane array overlies the edges of said unstrapped forward wave vane array to provide additional capacitive coupling to said forward wave section and to enhance the mechanical strength of said composite circuit.

11. The apparatus according to claim 8, wherein said forward wave circuit section is formed by a vane array having a pair of straps overlying the top and bottom edges of the array in non-contacting relation, and wherein said backward wave circuit section is made up of a choke supported interdigital line.

12. The apparatus according to claim 8, wherein said backward wave circuit section is formed by a choke supported interdigital line and wherein said forward wave circuit section is formed by a double helix coupled vane circuit.

13. The apparatus according to claim 8, wherein said forward wave circuit section is formed by a crown supported reactively loaded interdigital line, and wherein said backward wave circuit section is formed by a crown supported interdigital line.

14. The apparatus according to claim 8, wherein said forward wave circuit section is formed by a choke supported reactively loaded interdigital line, and wherein said backward wave circuit section is formed by a choke supported interdigital line.

References Cited

UNITED STATES PATENTS

| | | | |
|---|---|---|---|
| 2,504,329 | 4/1950 | Heising | 315—39.69 |
| 3,121,820 | 2/1964 | Wilbur | 315—39.69 X |
| 3,121,821 | 2/1964 | Yu | 315—39.69 |
| 3,121,822 | 2/1964 | Boyd | 315—39.69 |
| 3,176,188 | 3/1965 | Wilbur | 315—39.69 |

HERMAN K. SAALBACH, *Primary Examiner.*

S. CHATMON, Jr., *Assistant Examiner.*

U.S. Cl. X.R.

315—3.6, 39.65, 39.69, 39.75